(No Model.)
9 Sheets—Sheet 6.
C. MANN, Dec'd.
M. MANN, Administratrix.
AUTOMATIC PHOTOGRAPHIC APPARATUS.
No. 587,221.  Patented July 27, 1897.
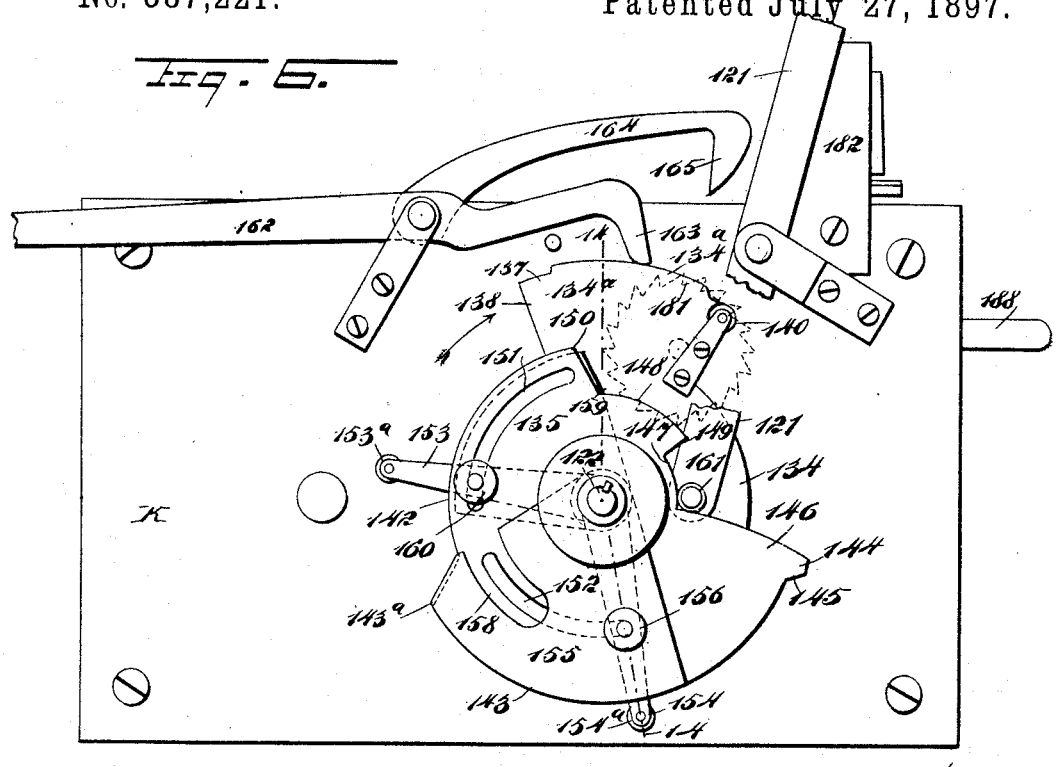
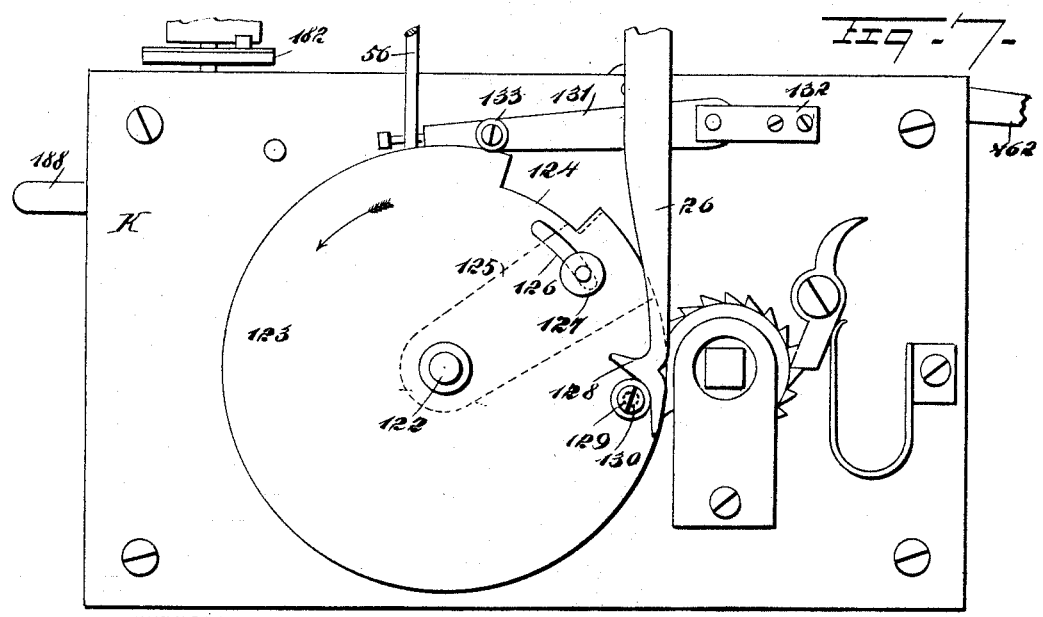
WITNESSES:  INVENTOR (No Model.) 9 Sheets—Sheet 7.
C. MANN, Dec'd.
M. MANN, Administratrix.
AUTOMATIC PHOTOGRAPHIC APPARATUS.
No. 587,221. Patented July 27, 1897.
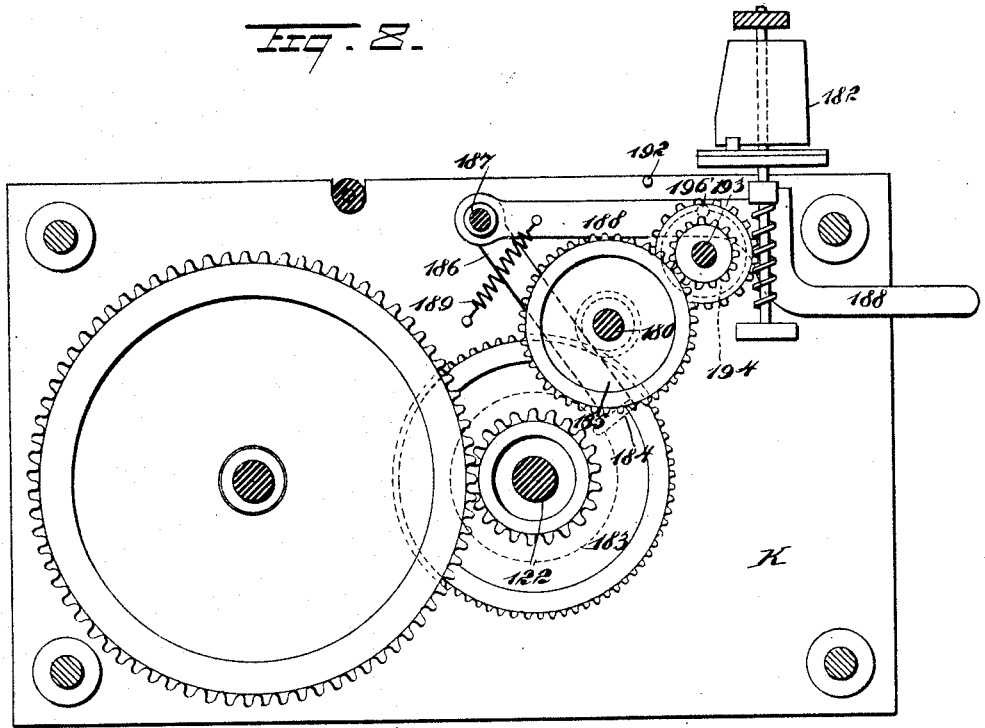
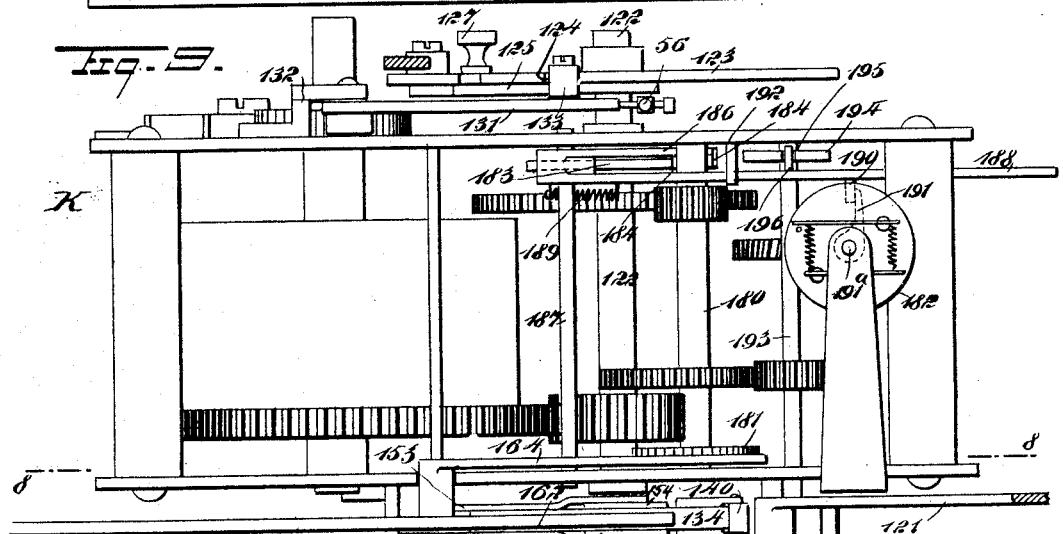
WITNESSES:
INVENTOR
ATTORNEYS.

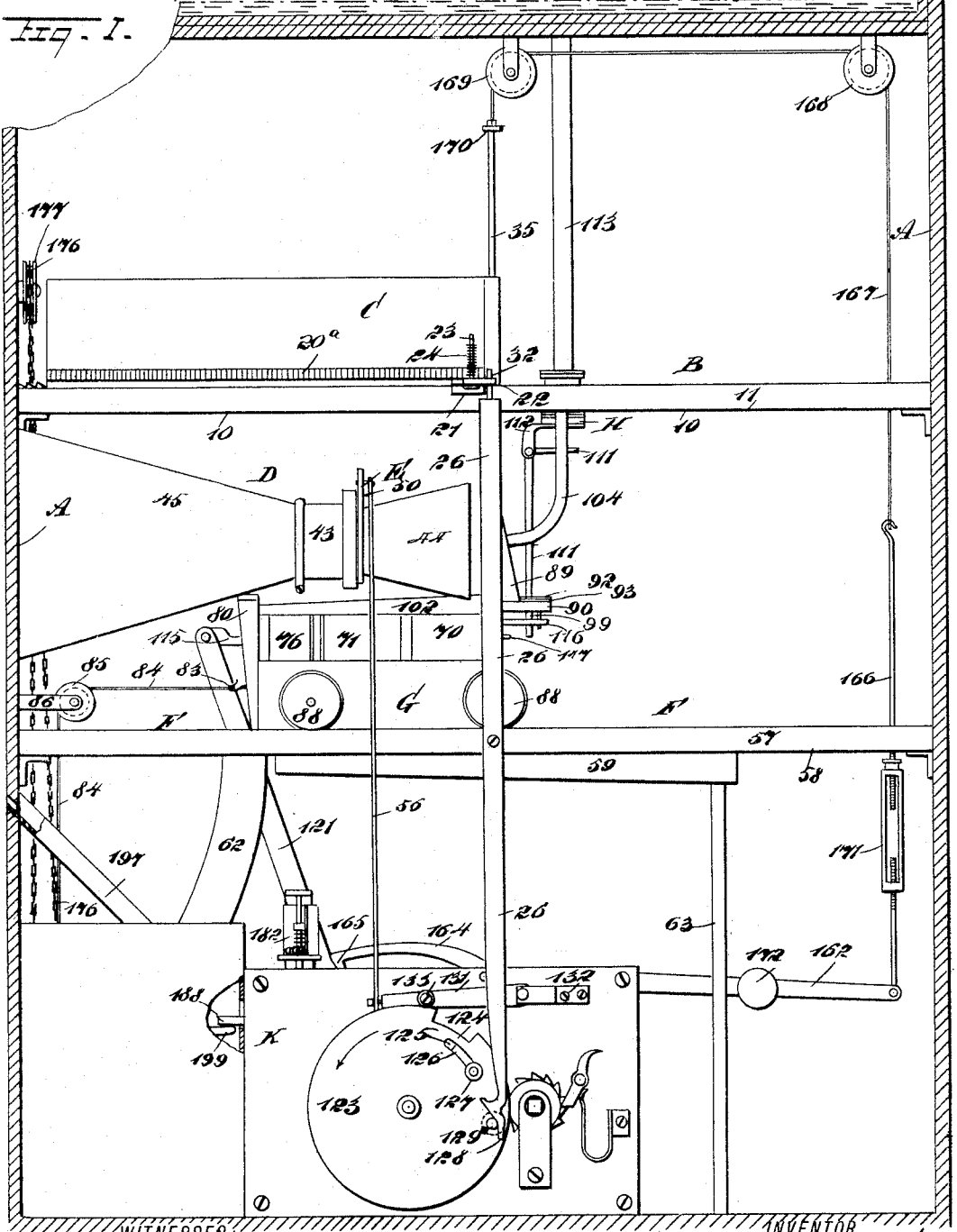

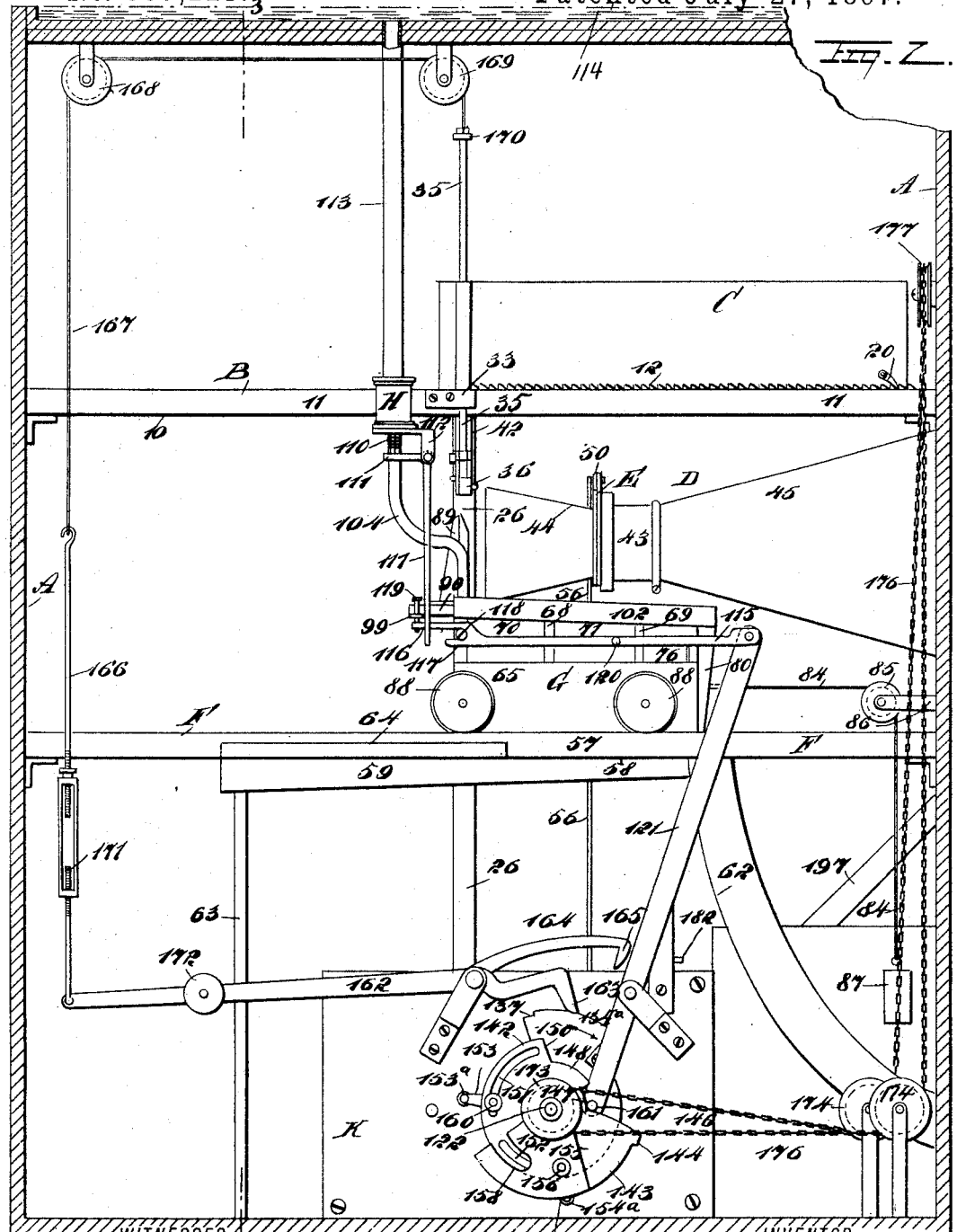

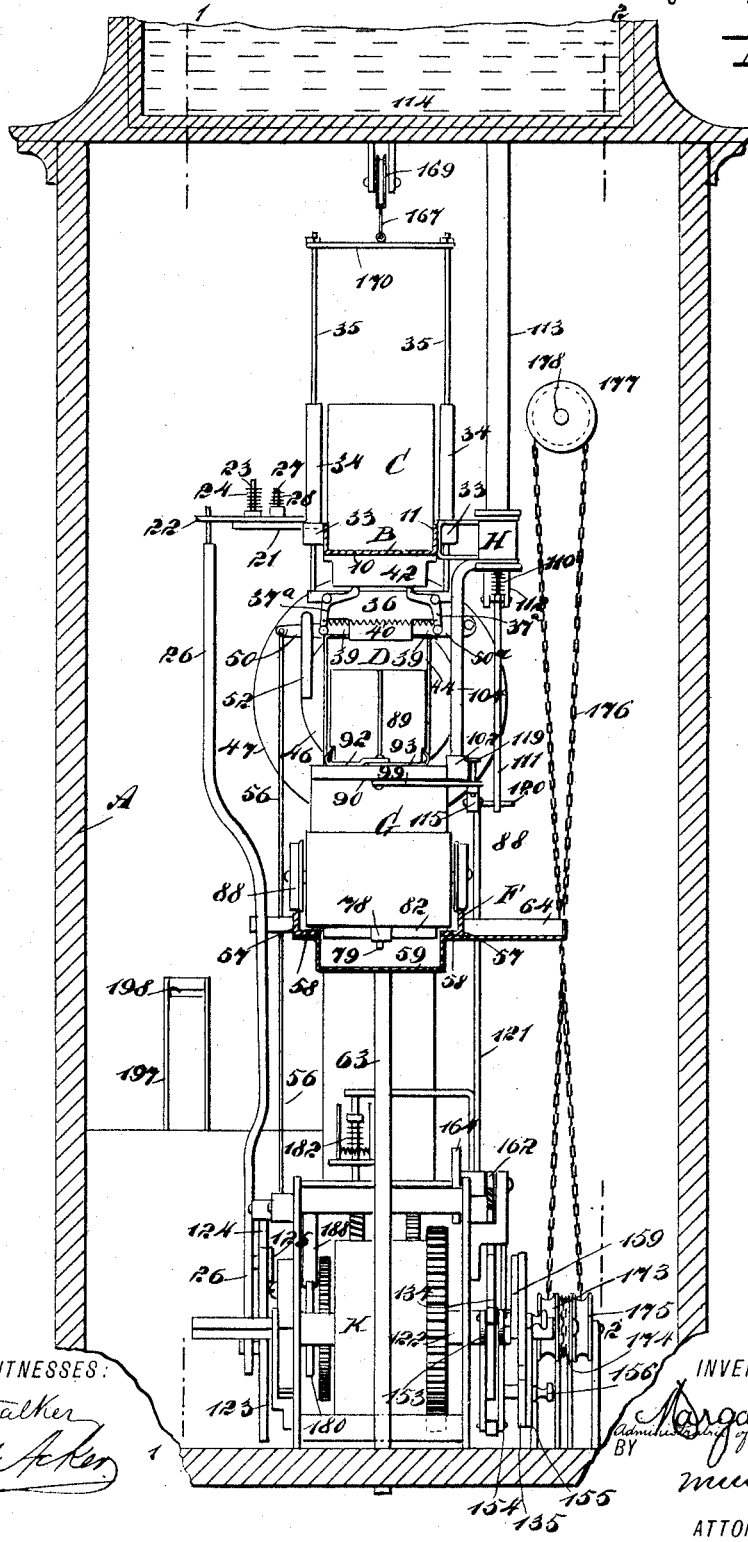

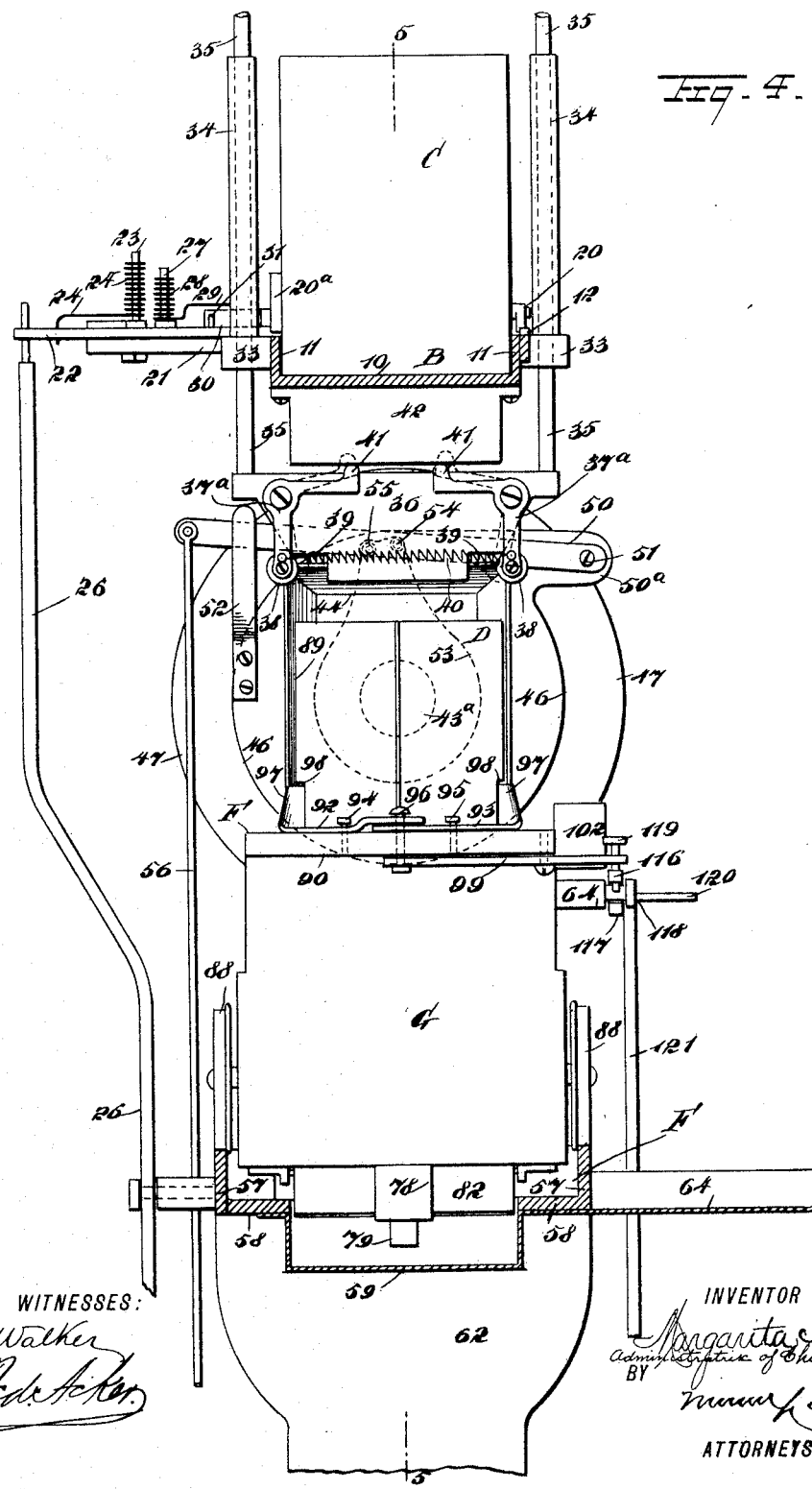

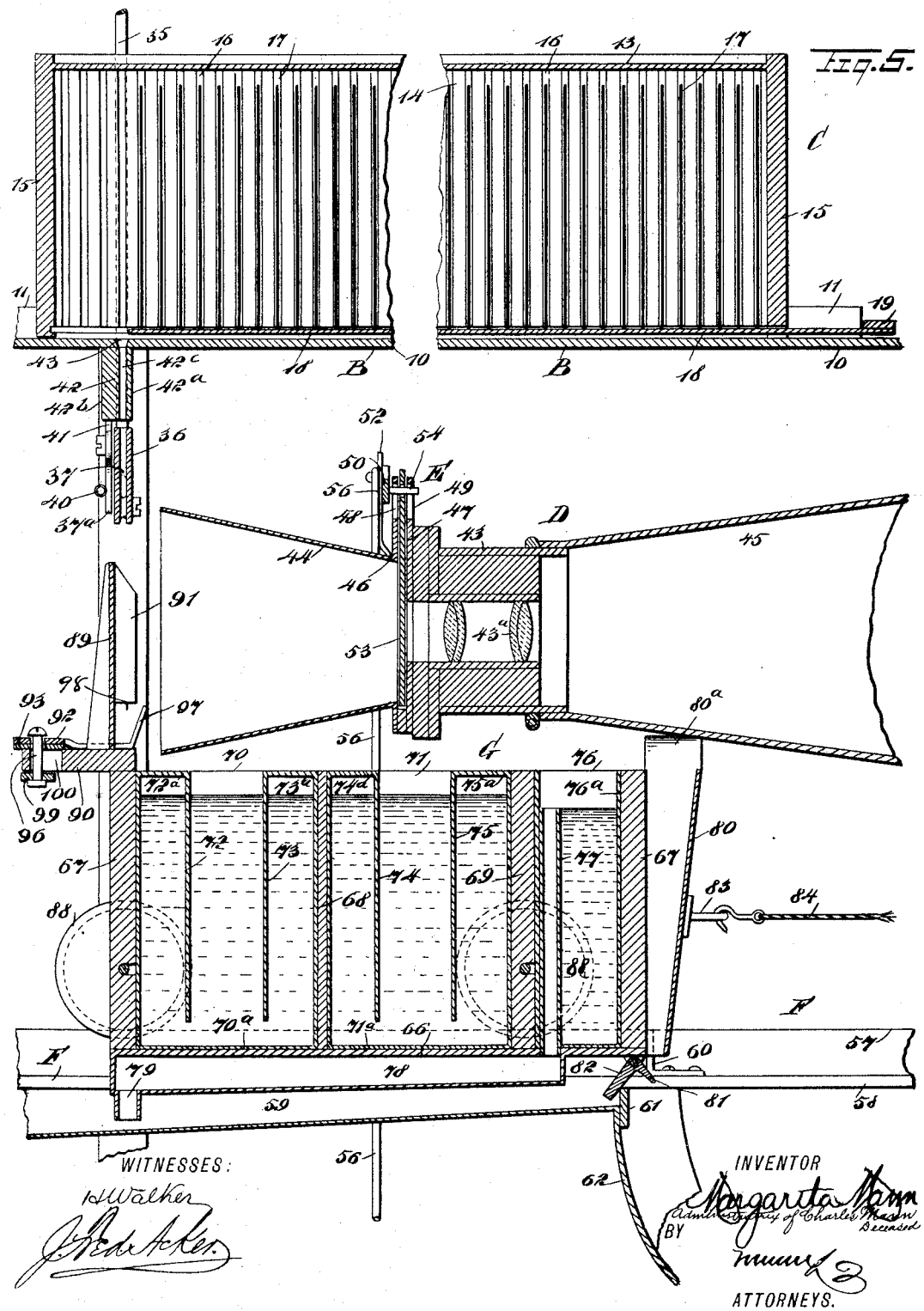

(No Model.) 9 Sheets—Sheet 8.
C. MANN, Dec'd.
M. MANN, Administratrix.
AUTOMATIC PHOTOGRAPHIC APPARATUS.
No. 587,221. Patented July 27, 1897.
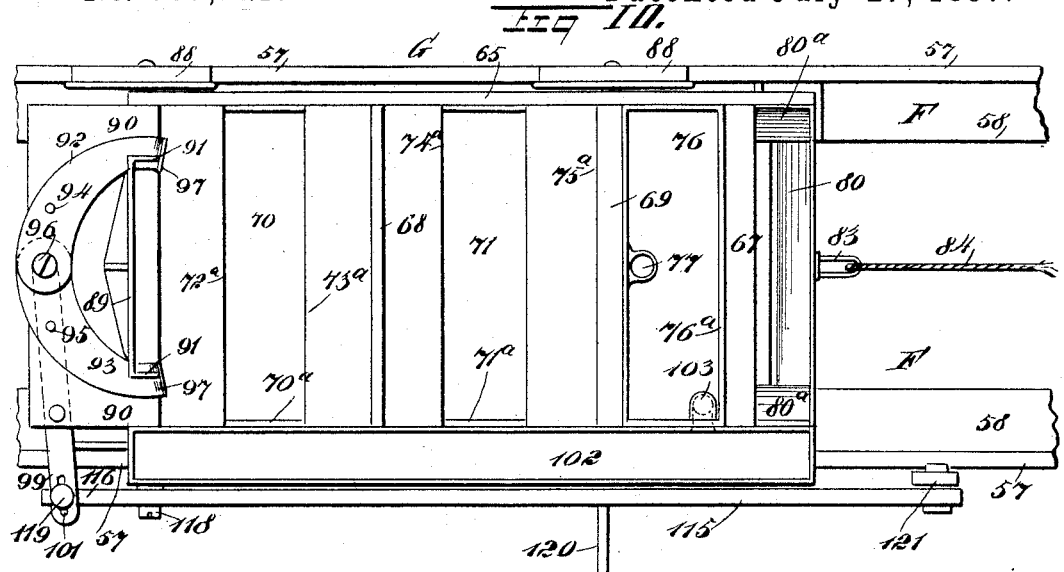
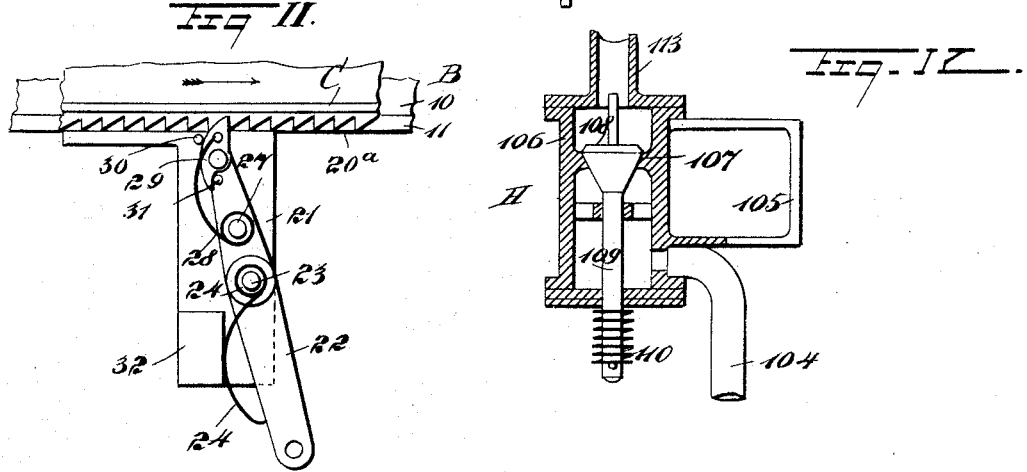
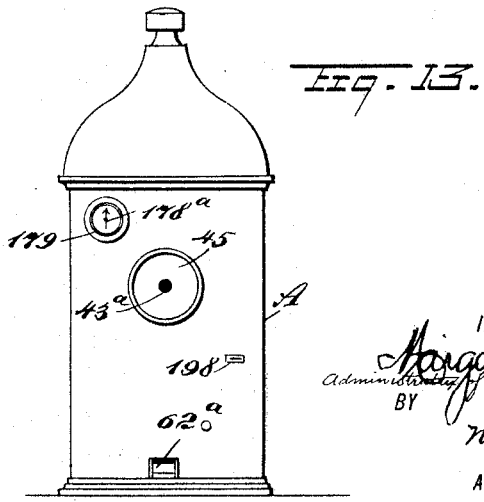
WITNESSES:
H. Walker
J. Fred Acker
INVENTOR
Margarita Mann
Administratrix of Charles Mann, Deceased
BY
Munn & Co.
ATTORNEYS.

(No Model.) 9 Sheets—Sheet 9.
C. MANN, Dec'd.
M. MANN, Administratrix.
AUTOMATIC PHOTOGRAPHIC APPARATUS.
No. 587,221. Patented July 27, 1897.
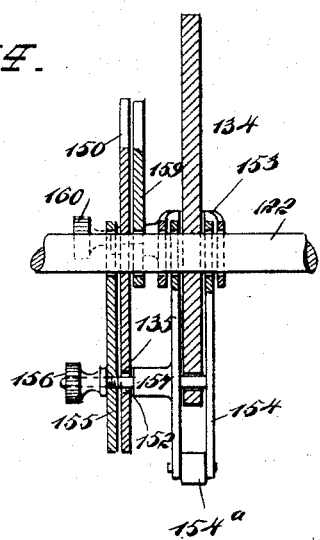
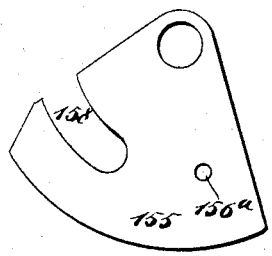
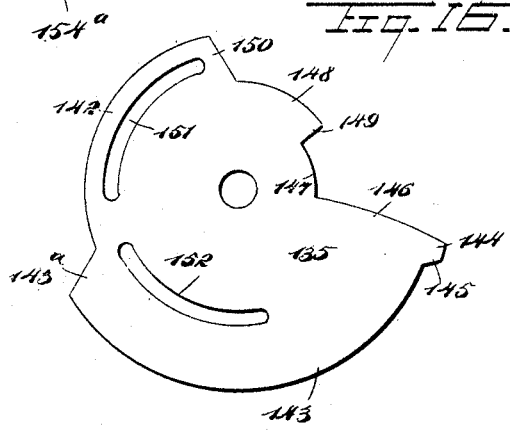
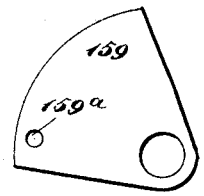
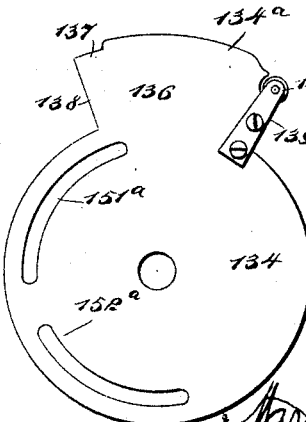
WITNESSES:
I H Walker
INVENTOR
Margarita Mann
Administratrix of Charles Mann
BY
ATTORNEYS.

UNITED STATES PATENT OFFICE.

MARGARITA MANN, OF NEW YORK, N. Y., ADMINISTRATRIX OF CHARLES MANN, DECEASED.

AUTOMATIC PHOTOGRAPHIC APPARATUS.

SPECIFICATION forming part of Letters Patent No. 587,221, dated July 27, 1897.

Application filed January 27, 1897. Serial No. 620,914. (No model.)

*To all whom it may concern:*

Be it known that I, MARGARITA MANN, of New York city, in the county and State of New York, administratrix of the estate of CHARLES MANN, deceased, who did in his lifetime invent a new and Improved Automatic Photographic Apparatus, do hereby declare the following to be a full, clear, and exact description of the said invention.

The object of the invention is to improve upon and simplify the construction of the coin-operated photographic apparatus patented to Charles H. C. Föge, Carl H. Griese, and Joseph L. F. Raders, No. 437,104, dated September 23, 1890.

A further object of the invention is to provide for the complete control of the time of exposure and the time of development and the delivery of the finished picture from the machine.

Another object of the invention is to construct a photographic apparatus that will be operated by a motor and which when the power is once applied will be automatic in every movement.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a section through the center of the machine, the section being taken on the line 1 1 of Fig. 3, showing the motor and mechanism in the casing in side elevation. Fig. 2 is a section through the casing on the line 2 2 of Fig. 3, illustrating the motor and mechanism within the casing in elevation, viewed from the side opposite that shown in Fig. 1. Fig. 3 is a vertical section through the casing, said section being on the line 3 3 of Fig. 2. Fig. 4 is a front elevation of the photographic apparatus on an enlarged scale, the track in which the plate-receptacle moves and the track upon which the bath-carriage has movement being shown in transverse section on the line 3 3 of Fig. 2. Fig. 5 is an enlarged central vertical section through the plate-receptacle, its support, and through the camera-box and the bath-carriage, the section being taken substantially on the line 5 5 of Fig. 4. Fig. 6 is a view of one side of the motor. Fig. 7 is a view of the other side of the motor. Fig. 8 is a vertical section through the motor, taken on the line 8 8 of Fig. 9. Fig. 9 is a plan view of the motor. Fig. 10 is a detail plan view of the bath-carriage. Fig. 11 is a detail plan view of the feed mechanism for the plate-receptacle. Fig. 12 is a sectional view through the valve used in connection with the bath-carriage. Fig. 13 is a front elevation of the casing of the apparatus. Fig. 14 is a sectional view through the cams at the right-hand side of the machine, the cam-shaft being in side elevation. Fig. 15 is a detail view of the cam-plate, which is located at the outer face of the outer right-hand cam shown in Fig. 14. Fig. 16 is a detail view of the outer right-hand cam. Fig. 17 is a detail view of the adjusting-plate, which is in engagement with the inner face of the outer right-hand cam shown in Figs. 14 and 15; and Fig. 18 is a detail view of the inner right-hand cam, which is also shown in Figs. 2 and 14.

A casing A is provided of any suitable size and of any suitable shape. Within this casing at a point near the top a track B is transversely located, which track consists of a bed 10 and side flanges 11, which extend upward from the bed, but the said side flanges terminate at a point short of the front of the casing, as illustrated in Fig. 5. On one side flange 11, commencing from a point near the center and terminating at the front of the casing, a rack 12 is formed.

A receiver or reservoir C for plates is adapted to travel on the aforesaid track B, and this reservoir or receiver, which is best shown in Fig. 5, is in box shape, consisting of a top 13, sides 14, and end portions 15, and in the sides vertical grooves 16 are produced, and in corresponding grooves 16 the plates 17 that are to be exposed are placed. The bottom portion of the receiver or reservoir C is provided with a sliding bottom 18, and the said sliding bottom at one of its ends has a batten 19 secured thereon, which when the receiver or reservoir C is placed in its initial position on the track B is brought in engagement with the ends of the flanges 11 of the said track, as shown in the aforesaid view, Fig. 5, so that the sliding bottom will be held stationary and will uncover a predetermined portion of the inner part of the box or reservoir C as the latter is moved in an inwardly direction, in a manner to be hereinafter described.

At the side of the receiver or reservoir C opposite that near which the rack 12 is placed teeth 20ª are formed horizontally upon the side of the said reservoir, and at the opposite side near the forward end of the reservoir a pawl 20 is attached, adapted for engagement with the rack 12. From that side of the track B at which the teeth 20ª of the receiver or reservoir are located a horizontal bracket 21 is projected, and upon this bracket a lever 22 is fulcumed through the medium of a stud 23, and the said stud is surrounded by a spring 24, attached to the stud at one of its ends, the other end of the spring having bearing against the forward side of the lever facing the end of the casing from which the plate reservoir or receiver is moved, as shown in Fig. 11.

The outer end of the lever 22 is attached to a shifting-rod 26, which is carried to a connection with a motor, to be hereinafter described. A post 27 is secured upon the lever 22 between the stud or post 23 and the inner end of the lever, and a spring 28 is coiled around and is attached to the post 27, and the opposite end of this spring is attached to a dog 29, which is pivotally connected with the inner end of the lever 22 and is adapted for engagement with the teeth 20ª on the plate receiver or reservoir C, as is also best shown in Fig. 11. A pin 30 is secured upon the bracket 21, and the said pin rests against the dog 29 below it when the inner end of the lever 22 is drawn inward to travel in an inwardly direction, so as to clear the teeth 20ª of the reservoir or receiver for the plates; but when the lever 22 is carried at its outer end in direction of the starting-point of the receiver or reservoir the dog 29 will be compelled to enter the space between two adjacent teeth of the receiver or reservoir of the plates and move the said receiver or reservoir the distance corresponding to that between the teeth 20ª, and this is accomplished by placing a pin 31 upon the lever 22, so as to engage the outer end of the dog at the face opposite that at which the pin 30 engages, as shown in Fig. 11, and as the plate receiver or reservoir is moved forward it is prevented from having a return movement through the medium of the pawl 20. (Shown in Fig. 2 and heretofore referred to.)

The spring 24 is made to bear against a block 32 at the outer end and outer side of the bracket 21, as shown in Fig. 11, and this block 32 will also serve to limit the movement of the outer end of the lever 22 in direction of the outer side of the machine.

At the inner end of the rack 12, formed on the track B at each side of the said track, a guide or a bearing 33 is constructed, and from these bearings guide-tubes 34 are upwardly extended, as shown in Fig. 3. In each of the guide-tubes 34 and their corresponding bearings 33 a rod 35 is held to slide. These rods are attached to a plate-holder 36, the said plate-holder being provided with an opening 37, extending from top to bottom and from side to side.

An elbow or angle lever 37ª is pivoted upon the inner face of the plate-holder near each of its ends, and the vertical members of the said levers extend downward below recesses 39, which are formed in the end portions of the plate-holder, as shown also in Fig. 3, and carry at their lower extremities friction-rollers 38. A spring 40 connects the vertical members of the two angle-levers 37ª, as shown in the same figure, and the horizontal members of these levers extend in direction of the center of the upper portion of the plate-holder and terminate at their free ends in knobs or projections 41. These knobs or projections are adapted to engage with a throat 42, which is attached to the bottom portion of the track B, over which the plate receiver or reservoir has movement, the said track being provided in its bottom with an opening 43 of such dimensions as to receive a plate from the receiver or reservoir, the opening corresponding in width to the opening in the plate-holder 36. The connection between the plate-holder and the track is especially shown in Fig. 5.

The outer wall 42ª of the throat is much thinner than the inner wall 42ᵇ, and the projections or heads 41 of the levers of the plate-holder are adapted to engage with this thicker wall 42ᵇ of the throat when the plate is to be released from the holder or when the holder is in position to receive a plate. The opening in the throat is designated as 42ᶜ.

Beneath the track B the camera D is located, and this camera may be of any suitable or approved construction. In the drawings the body portion 43 of the camera is shown as provided with two lenses 43ª, one being shown in dotted lines in Fig. 4 and both in positive lines in Fig. 5; but the lenses may be of different character than those shown, or they may be differently distributed, or may be single, if necessary. A hood 44 is projected from the inner face of the camera, or at a point back of its lenses, and this hood extends inwardly to a point slightly forward of the plate-holder 36 and the throat 42. A conducting-casing 45 is attached to the forward portion of the camera, or at a point forward of its lenses, and this conducting-casing is funnel-shaped, as is likewise the hood 44, and the conducting-casing extends outward to the front of the main casing or housing for the device, as shown in Fig. 13, its enlarged portion being its outer end.

In the construction of the camera a flange 46 is formed around the contracted end of the hood 44 and a flange 47 is formed around the body portion 43 of the camera opposed to and spaced from the flange 46. Between these two flanges 46 and 47 the shutter E of the camera is adapted to operate. In the upper central portion of the flange 46 of the hood 44 a vertical slot 48 is produced, and a similar slot 49 is made in the flange 47 of the body portion 43 of the camera. A lever 50 is fulcrumed upon preferably an extension $50^a$, (shown in Fig. 3,) located at one side of the flange of the hood 44, the fulcrum-pin being designated as 51, and at the opposite side of the same flange 46 of said hood 44 a guide 52 is located, between which and the flange of the body 43 of the camera the free end of the lever 50 has movement. The shutter 53 is shown in dotted lines, Fig. 4, as of pear-shaped formation, being pivoted at its contracted end by means of a pin 54 to the lever 50, and at the opposite side of its contracted end the said shutter is pivoted by a pin 55 to the flange of the body of the camera, as shown in dotted lines in Fig. 3. Therefore when the lever 50 is drawn downward the shutter will be thrown to one side of the camera, so as to expose its lens or lenses, and when the lever 50 is carried upward the shutter will be carried over the lens or lenses to make the same opaque. The movement of the lever 50 is accomplished through the medium of a connecting-rod 56, which is carried downward to a motor of any approved construction whose location and operation will be hereinafter set forth.

Below the track B, upon which the plate receiver or reservoir travels, a second track F is located within the main casing A, and each rail of this lower track F, as shown in cross-section in Fig. 4, is of angular construction, each of said rails comprising a vertical section or member 57 and a horizontal member 58. Between the ends of the rails of the track a pan 59 is located, and this pan has a downward and inward inclination, and in front of the forward or outer end of the pan a buffer 60 is secured upon each rail of the track F, as shown in Fig. 5. Slightly back of the buffers 60 a cross-bar 61 is secured upon the rails of the track, the said cross-bar forming the front end of the pan 59, as is also shown in Fig. 5. From this cross-bar a chute 62 is curved downward to the front of the casing, finding an exit near the bottom thereof, as shown at $62^a$ in Fig. 13. The pan 59 is virtually a drip-pan and is provided with an offtake-pipe 63, which extends downward through the bottom of the casing. At one side of the track F a basin 64 in the shape of a pan is located, as illustrated in Figs. 2 and 4.

A bath-carriage G is adapted to travel on the rails of the track F, and this bath-carriage, as shown in Figs. 5 and 10, consists of side pieces 65, a bottom 66, and ends 67, which are preferably made of greater width than the sides. The bath-carriage is divided into various compartments 70 and 71 and 76, the division being made through the medium of partitions 68 and 69, which extend upward as high as the ends of the carriage. The partitions 68 and 69 are so located that the compartments 70 and 71 are practically of the same size, while the forward end compartment 76 is of much smaller dimensions.

The compartment 70 is adapted to contain a developing compound, the compartment 71 the fixing compound, and the end compartment is adapted to receive clear water for the purpose of washing the plate. The compartment 70 contains a receptacle $70^a$, and this receptacle is provided with two partitions 72 and 73, extending from the top to within a predetermined distance of the bottom, the partition 72 being connected with one end of the receptacle by an upper plate $72^a$, and the partition 73 is likewise connected with the opposite end of the compartment by an upper horizontal plate $73^a$. The space between the two partitions 72 and 73 is sufficient to admit of a plate being agitated vertically in the developing compound. In the compartment 71, adapted to contain the fixing compound, a receptacle $71^a$ is located, which is provided with vertical partitions 74 and 75, connected with the ends of the compartment by horizontal plates $74^a$ and $75^a$ in like manner as has been described in the construction of the receptacle $70^a$, receiving the developing compound.

In the compartment 76, which is adapted to receive the washing compound or the clear water, a receptacle $76^a$ is introduced, and this receptacle is provided with an overflow-pipe 77, which extends through the bottom of the receptacle and through the bottom of the bath-carriage, as shown in Fig. 5, and communicates with a trough 78, which is formed at the bottom of the bath-carriage and is provided with an outlet 79, which is in communication with the drip-pan 59. At the outer end of the bath-carriage, or at the end where the washing-compartment is located, a vertically-inclined chute 80 is formed, contracted at the bottom and open at the top, the upper side portions of this compartment being carried above the bath-carriage, as shown at $80^a$ in Fig. 5, and when the plates have been fully developed and fully washed they are delivered by the plate-holder, the grip-levers of the same being released from the plate, into the chute 80, and from thence they drop into the chute 62 and are conducted to the front exterior portion of the casing. The bottom of the chute 80 or "pocket," as it may be more properly termed, is open, but is normally closed by a gravity-door 81, which is provided with a downwardly-extending tongue 82, and when the bath-carriage is brought to its starting or normal position the lip or tongue 82 will strike the cross-bar 61 and will lower the bottom 81, permitting the plate to pass from the pocket 80 into the chute 62, the plate being then in a finished condition. An eye 83 is formed upon the outer side of the pocket 80, and to this eye one end of a cord, rope, or chain 84 is attached, which cord, rope, or chain is passed over a pulley 85 downwardly within the casing, and at its lower end the cord, rope, or chain carries a weight 87, this weight being intended to draw the bath-carriage back to its normal position after the plate has been developed, fixed, washed, and deposited in the pocket 80, so that the plate by tripping the bottom 81 may be delivered in its finished condition to the front of the machine. The pulley 85 is supported by a suitable bracket 86. The bath-carriage is supported by wheels 88, located upon axles, the wheels being arranged to travel on the rails of the track F.

At the inner end of the bath-carriage, at the top, a vertical partition or a guide-board 89 is located, being supported upon a horizontal platform 90, extending from the inner upper end of the aforesaid bath-carriage. This guide-board 89 is provided at each side with a flange 91, which is at a right angle to the board, but the flange terminates short of the bottom portion of the board, and upon the platform 90 at the back of the board two segmental arms 92 and 93 are pivoted, the pivot-pins 94 and 95 being between their ends and made to enter the platform 90, but the two arms 92 and 93 are made to overlap, and are connected by a pin 96, and the free end 97 of each arm 92 and 93 is upwardly bent, and the upwardly-extending ends are of such height that when the arms are drawn together at their free ends the said vertical ends will pass under the flanges in the guide-board 89, the flanges being cut away, as shown at 98 in Fig. 5.

A lever 99 is attached to the lower end of the connecting-pin 96 of the two arms 92 and 93, the said arms being adapted to temporarily clamp the plate to be exposed, and the connecting-pin 96 has movement in a slot 100, made in the platform 90 of the bath-carriage, and the lever 99 extends beyond one end of the platform on one side of the bath-carriage, and is provided at its extended end with a longitudinal slot 101. (See Fig. 10.)

At one side of the bath-carriage a trough 102 is formed at the top, and this trough is connected by a pipe 103 with the washing-compartment 76 of the bath-carriage, as shown in Fig. 10. A pipe 104 is located over the trough 102, and this pipe 104 is connected with the body 106 of a valve H, which is secured by a clip or bracket 105, or otherwise, preferably to the central portion of the upper track B. This valve-casing is provided with a seat 107, upon which a gravity-valve 108 normally rests, the stem 109 whereof extends downward through the bottom of the valve-casing, and is surrounded by a spring 110, having bearing against a projection on the lower portion of the said valve-stem.

An angle-lever 111 is fulcrumed upon a bracket 112, as shown in Fig. 2, the said bracket being projected from the valve-casing, and the horizontal member of the lever is normally in engagement with the lower end of the valve-stem 109, while the lower portion of the vertical member extends downward in such manner that it will be at one side of the bath-carriage G when the said carriage is traveling on its track. The upper portion of the valve-casing 106 is connected with a pipe 113, which pipe is carried upward to a connection with a tank 114, which is preferably placed on the top of the main casing of the machine, but which may be otherwise located if in practice it is found desirable.

A propelling-arm 115 is used in connection with the bath-carriage. This propelling-arm is at the right-hand side of the carriage, and at its inner end it is bifurcated in a manner to form an upper long member 116 and a lower short member 117. A stud 118 is received between the members of the bifurcated portion of the propelling-arm, as shown in Fig. 2, and a set-screw 119 is passed through the slot 101 in the lever 99, connected with the clamping-arms 92 and 93 on the platform 90 of the said carriage. A spur 120 is projected horizontally outward from a point near the central portion of the propelling-arm 115, and this spur is adapted to engage the lower end of the vertical member of the lever 111, which operates the valve supplying water from the tank 114 when the carriage is brought to a predetermined position. The propelling-arm 115 is connected at its outer end in a pivotal manner with a lever 121, which leads down to a suitable motor.

The motor K is preferably a clockwork-motor and may be of any suitable construction. The driven shaft 122 of the motor at its left hand carries a disk 123, and the said disk is provided in its periphery with a recess 124, and adjacent to this recess a movable member 125 is located in engagement with its inner face. The said movable member 125, which is a regulating member, is fulcrumed upon the shaft 122. The disk is provided with a segmental slot 126, and a set-screw 127 is passed through the said slot 126 into the regulating member 125 of the disk 123, as shown best in Fig. 7. The lower end of the lever 26, which is connected with the shifting-lever 22, provided for the plate box, receiver, or reservoir C, terminates in a foot 128, and the inner face of the foot is concaved, as shown also in Fig. 7. This foot is adapted to be engaged by a roller 129, which is mounted to revolve upon a stud 130, carried by and located upon the outer face of the motor-disk 123 at the left-hand side of the machine.

The lens-operating arm 131 is pivoted upon a stud which is carried by a bracket 132, attached to the left-hand side of the motor, and the lens-operating arm carries a roller 133, which is in engagement with the upper peripheral portion of the left-hand disk 123 of the motor, and the inner end of this arm is connected with the rod 56, which is attached to the shutter of the lens.

When the motor is started, the position of the parts will be that shown in Fig. 7, and the motor, revolving in the direction indicated by the arrow in Fig. 7, will force the lower end of the lever 26 of the shifting mechanism of the plate box or receptacle C outward and will cause the dog 29 of the aforesaid shifting mechanism to move the plate-box the distance of one tooth 20ª on its left-hand side, bringing one of the plates in the box opposite the opening 42ᶜ in the throat 42, the bottom 18 of the box being held stationary, as shown in Fig. 5. The plate will drop through the throat and through the plate-holder 36 upon the platform 90 of the bath-carriage, which platform at its bottom will be immediately in front of the hood 44, and the lower end of the plate will be held from moving by the extensions 97 at the ends of the clamping-arms 92 and 93.

Almost immediately after the plate-box has been shifted to drop a plate the roller 133 of the lens-operating arm 131 will have dropped in the recess 124 of the disk 123, thereby opening the shutter, which opening will be accomplished through gravity, and when the roller 133 of the lens-carrying arm has traveled up the rear wall of the recess 124 the shutter will have been closed and the exposure will have been completed. The time of exposure is regulated by moving the regulating-plate 125 over the recess 124 in the left-hand disk 123, and the nearer the regulating-arm is carried to the forward wall of the aforesaid recess 124 the shorter will be the exposure, and vice versa.

On the right-hand end of the cam-shaft 122 a cam 134, together with a second cam 135, is secured. The cam 134, which is the innermost cam, is provided with a salient surface 134ª, and near the back of the said salient surface a depression 137 is made. The salient surface of the cam 134 is connected with the body at the rear by a radial surface or a shoulder 138, while at the front shoulder or surface 139 of the cam, adjacent to the salient surface, a friction-roller 140 is located. The outermost cam 135, which is illustrated in detail in Fig. 16, is provided with a salient surface 143, which is separated from a depressed surface 142 by a shoulder or surface 143ª. The salient surface 143 is provided at the end opposite that at which the shoulder 143ª is located with a projection 144, having a radial surface or shoulder 145 at what may be termed its "rear" portion, while the cam 135 is provided, further, with a surface or a shoulder 146, which extends from the point or spur 144 to a depressed surface 147, located adjacent to the axis of the cam. The surface 147 is nearer the center or axis of the cam than any other depressed surface thereon, and at the opposite end of this greatest depressed surface 147 a shoulder or surface 149 is formed, which connects with another depressed surface 148, which is farther from the center of the cam than the first-mentioned depressed surface 147, and the latter surface 147 is connected with this medium depressed surface 148 by means of a shoulder or a depressed surface 150.

The cam 135 is provided adjacent to its first depressed surface 142 with a radial slot 151, and adjacent to the salient surface 143 a second radial slot 152 is formed, and in the body portion of the inner cam 134 radial slots 151ª and 152ª are formed, adapted for registry with the slots 151 and 152 in the cam 135.

Two arms 153 and 154 are fulcrumed upon the cam-shaft 122. Both of these arms are provided with two members which straddle the inner cam 134, one of the arms terminating at its outer end in a friction-roller 153ª and the other in a friction-roller 154ª. An adjusting-plate 155 is loosely mounted on the cam-shaft 122 and is held to slide upon the outside face of the outermost cam 135, the radial edge of the plate 155 corresponding to the formation of the salient surface 143 on the aforesaid outer cam 135, as shown in Fig. 6, and one end of the plate 155 is adapted to either register with or extend beyond the shoulder or surface 143ª of the outer cam 135 and over the first depressed surface 142, as is also shown in Fig. 6.

A set-screw 156 is passed through an opening 156ª in the adjusting-plate 155, which opening is shown in Fig. 15, and the set-screw 156 is further passed through the slot 152 in the outer cam 135 and into a post 157, which is located upon the arm 154, (see Fig. 14,) and the said set-screw is further passed through the slot 152ª in the innermost cam to an engagement with the innermost member of the aforesaid cam-arm 154. A slot 158 is made in the adjustable cam-plate 155, and this slot is made to face the slot 151, made in the outer cam 135, as shown in Fig. 6.

At the back of the outer cam 135 a second cam-plate 159 is located, being fulcrumed on the cam-shaft 122. This second cam-plate 159 is shown in Figs. 6, 14, and 17 and is adapted to advance the radial surface 150 of the cam 135 when necessary. A set-screw 160 is passed through the slot 151 in the outer cam and through an opening 159ª in the cam-plate 159, and is also carried through the slot 152ª in the inner cam to an engagement with the second cam-arm 153, located on the cam-shaft 122. The lower end of the lever 121, which is attached to the shifting-rod 115, connected with the bath-carriage, is fulcrumed upon the casing of the motor, as illustrated in Fig. 2; but at the lower end of this lever 121 a pin 161 is located, adapted to travel upon the peripheral portion of the outer cam 135 at the right-hand end of the machine.

A lever 162 is fulcrumed upon the top right-hand side of the motor-casing, as shown in Fig. 2 and 6, and the inner end of a lever 161 terminates in a head 163, which is arranged to travel upon the periphery of the inner cam 134, as is particularly shown in the aforesaid Figs. 2 and 6. A branch arm 164 is attached to the lever 162 at or near its fulcrum, and the branch arm extends upward and inward over the head 163 of the lever 162 and terminates in a head 165, for a purpose to be hereinafter set forth.

A link 166 is attached to a cord 167, which cord, or chain if necessary, is passed over guide-pulleys 168 and 169 at the top portion of the casing of the machine and downward to an engagement with a cross-bar 170, which connects the arms 35 of the plate holder or carrier, as shown in Fig. 2. A turnbuckle 171 forms a portion of the link connection 166 between the cord or chain 167 and the lever 162. A weight 172 is located on the lever 162, being so adjusted as to hold the head 163 of the lever in engagement with the peripheral surface of the inner left-hand cam 134.

On the extreme right-hand end of the cam-shaft 122 a pulley 173 is secured, and near the forward side of the casing A two pulleys 174 and 175 are located, as shown in Fig. 2, and a chain or other belt 176 is passed over the pulley 173, one strand being carried upward over the pulley 174 and the other strand upward over the pulley 175. The upper end of the belt 176 is passed over a pulley 177, held to revolve upon a spindle 178 near the upper front portion of the casing A. The spindle 178 is carried through to the front of the casing, as shown in Fig. 13, and carries a pointer $178^a$, held to revolve over a dial 179, upon which dial the words "Exposure," "Developer," "Finish," "Washing," and "Final finish" are usually produced, so that the person at the front of the machine, whose picture is to be taken, may be advised as to the different steps which are automatically taken by the machine.

A shaft 180 is located in the motor K, being driven from the cam-shaft 122 or being otherwise driven, as shown in Fig. 9, and on this driven shaft 180 a ratchet-wheel 181 is secured, with which ratchet-wheel the head 165 of the extension-arm 164 from the lever 162 is to engage when the head 163 of the aforesaid lever 162 is dropped to an engagement with the peripheral surface of the body portion of the inner cam 134.

The clock-motor is provided with any approved form of escapement 182, and upon the cam-shaft 122 a wheel 183 is secured, (shown in dotted lines in Fig. 8 and in positive lines in Fig. 9,) which wheel has an even periphery except at one point, where a depression 184 is produced, as illustrated particularly in Fig. 8. A stop-finger 185 is adapted to enter the depression 184 in the aforesaid wheel 183, as is also best shown in Fig. 8, and this finger is secured to an arm 186, which is attached to a rock-shaft 187, journaled in the frame of the motor K, as shown in Figs. 8 and 9. A starting-lever 188 is likewise attached to the rock-shaft 187, and this starting-lever extends out beyond the casing of the motor, as shown in both Figs. 8 and 9, while a spring 189 is attached to the starting-lever and to the casing, the spring 189 having a tendency to hold the starting-lever 188 downwardly, so that the finger 185 will enter the recess 184 in the aforesaid wheel 183.

A pin 190 is projected from the inner side of the stop-lever 188, and this pin is adapted for engagement with a finger 191, which is attached to the escapement-shaft $191^a$, the engagement occurring only when the starting-lever 188 is in its lowermost or normal position, as indicated by dotted lines in Fig. 9. The upward movement of the starting-lever 188 is limited by engagement with a pin 192, secured on the casing, as shown in Figs. 8 and 9, and a shaft 193, which is shown as driven from the shaft 180, is provided with a wheel 194 at its left-hand end, and this wheel has a plain periphery, with the exception of a recess 195 made in the said periphery, the wheel 194 being a stop-wheel of similar character to that of the wheel 183, heretofore alluded to. The stop-wheel 194 is adapted to be engaged by a pin 196, which is placed upon the left-hand side of the starting-lever and is adapted to enter the recess 195. The clockwork mechanism, which is adapted to run for one minute when the starting-lever is lifted, will be stopped at the expiration of the said minute, or whatever time may be determined upon, at three points—namely, the finger 184 will enter the recess 185 in the wheel 183 of the cam-shaft, the finger 191 on the escapement mechanism will engage with the pin 190 on the right-hand side of the starting-lever when the same is dropped by the finger 184 entering the aforesaid slot 185, stopping the escapement, and the third stoppage occurs when the pin 196, at the left-hand side of the starting-lever, enters the recess 195 in the wheel 194, as shown in Fig. 9.

The starting-lever may be operated in any desired manner—for example, as illustrated in Fig. 1, in which a coin-chute 197 is connected with the front of the casing of the machine, the coin being entered through a slot 198, (shown in Fig. 13,) and the said coin will depress the trip-lever 199, (shown partly in Fig. 1,) which may be pivoted near its center. The coin may be received upon the front end of the lever, causing its rear end to rise, engage with, and lift the starting-lever 188, but such mechanism forms no portion of my invention.

In the operation of the device, the clockwork mechanism having been set in motion, or the motor that may have been employed, the left-hand disk 123 will be revolved, together with the cams 134 and 135, but the left-hand disk 123 only will be brought into action. The pin 129 on the left-hand disk will operate the lever 26 in a manner to feed the plate-holder forward one notch, so as to bring the plate at the opening of the throat 42; but, as shown in Fig. 2, the lever 162 at the right-hand side of the machine will have been held upward, so as to force the angle-levers $37^a$ outward by bringing them in engagement with the bottom of the throat, so that the plate can drop through the throat into the holder 36 and through the holder upon the platform of the bath-carriage G, the clamping-arms 92 and 93 of the said bath-carriage receiving the lower end of the plate. While the left-hand disk 123 is acting to produce the above-named results, the pin 161 on the lever 121, connected with the propelling-arm of the bath-carriage, will be traveling in the greatest depressed surface 147 of the cam 135. Just before the pin 161 above referred to rides up on the shoulder or radial surface 149 of the cam 135 the head 163 of the plate-holder-controlling lever 162 will have entered the depression 137 in the salient surface 134ª of the cam 134, thus permitting the plate that has been exposed and is at that time gripped by the plate-holder to be above the level of the upper face of the bath-carriage. The action of the pin 161, traveling up the radial surface or shoulder 149, is such as to carry the bath-carriage backward or inward sufficiently to bring the developing-bath beneath the plate. The moment that the pin 161 on the lever connected with the propelling mechanism of the bath-carriage reaches the surface 148 of the cam 135 the head 163 on the arm 162, connected with the plate-holder, will have dropped down the surface 138 of the cam 134, bringing the head 165 of the extension-arm 164 in engagement with the agitating ratchet-wheel 181. Thus it will be observed that the plate held by the holder will be vertically agitated or reciprocated in the developing-bath as long as the pin 161 is in engagement with the depressed surface 148 of the cam 135. By the time the pin reaches the radial surface or shoulder 150 on this cam 135 the arm 153 will have engaged with the lever 162, connected with the plate-holder, and will have lifted the said lever at its head portion, thereby carrying the plate-holder upward a sufficient distance to clear the plate from the developing-bath and from the bath-carriage. As the pin 161 ascends the shoulder or radial surface 150 the bath-carriage is moved forward a sufficient distance to bring the fixing-bath below the plate, and the moment that the aforesaid pin 161 reaches the depressed surface 142 of the cam 135 the arm 153 will have released the lever 162, connected with the plate-holder, so that the head of this lever will be again brought in engagement with the agitating ratchet-wheel 181, and the agitation of the plate in the developing-bath will continue until the pin 161 reaches the radial surface or shoulder 143ª on the cam 135, at which time the second arm 154 will engage with the lever 162, connected with the plate-holder, and will raise the plate-holder, so that the bath-carriage may again be carried rearward a sufficient distance to bring the washing-bath below the plate, at which time the pin 161 will be traveling upon the surface 143 of the cam 135. As soon as the bath-carriage is thus shifted to bring the washing-bath beneath the plate the pin 120 on the propelling-arm 115 will strike the pendent portion of the lever 111, controlling the valve H, and will permit water from the tank 114 to flow down through the valve into the trough 102 and from thence through the outlet 103 into the washing-bath, from whence the water will pass into the lower trough 59 and out through the drip-pipe 63, the drip-pan 64 being placed in position to catch any drip that may occur from the aforesaid valve H. As the cam 135 revolves the plate will have vertical movement in the water or washing-bath, and when the pin 161 on the lever connected with the bath-carriage reaches the projection 144 in ascending the shoulder 145 the carriage will be moved still farther forward, the plate-holder having been taken up by reason of the head 163 on the lever 162, connected with the plate-holder, traveling over the roller 140 to the salient surface 143ª of the inner right-hand cam 134. This last upward movement of the pin 161, connected with the lever controlling the bath-carriage, is for the purpose of carrying the said bath-carriage a sufficient distance inward or rearward to bring the chute or pocket 80 beneath the plate, and when the head of the plate-holder lever 162 is in engagement with the salient surface 134ª of the cam 134 the clamping-arms of the plate-holder will be brought to an engagement with the bottom of the throat 42 and the plate will be released, permitting the plate to drop into the pocket 80 of the bath-carriage. Immediately following this latter movement the pin 161, connected with the lever controlling the bath-carriage, will descend the radial surface or shoulder 146 of the cam 135 and enter upon the greatest depressed surface 147, as shown in Fig. 2, being then in the position from which it started. The bath-carriage will at the same time be drawn rearward by means of its weight 87, and the pendent member 82 of the gravity-door 81 will strike the stop-bar 61 at the forward portion of the track F, causing the said gravity-door to open, as shown in Fig. 5, permitting the developed and washed plate to drop from the pocket 80 into the chute 62 and be delivered at the front portion of the machine. The plate-holder will now be beneath the throat which receives the plate from the receiver or reservoir, ready to receive another plate to be placed in a position for exposure. The time of developing and the time of fixing are controlled by the adjustment of the plates 155 and 159, carried by the cam 135 and connected with the trip-arms 153 and 154, which are adapted to carry the plate-holder to an upper position.

Having thus described the invention, what is claimed as new, and desired to be secured by Letters Patent, is—

1. The combination, with a camera, a lens and shutter for the same, a motor, and a shifting device for the shutter operated by the motor and arranged to regulate the time of exposure at the lens, of a plate-receptacle, a plate-holder provided with gripping devices, the said gripping devices being arranged to receive a plate from the receptacle and carry it in the field of the lens, a device arranged to release the plate from the grippers, said receptacle, holder and releasing devices being operated from said motor, substantially as described.

2. The combination, with a camera, a lens and shutter for the same, a motor, a shifting device for the shutter operated by the motor, and a regulating device carried by the motor and arranged to operate the shifting device, of a plate-receptacle, a plate-holder provided with gripping devices, said gripping devices being arranged to receive a plate from the receptacle and carry it in the field of the lens, a bath-carriage having its movement controlled by the motor in one direction, being tension-controlled in the opposite direction, and means, substantially as described, for reciprocating the plates in the bath-carriage and releasing the plates from the gripping devices.

3. In a photographic apparatus, the combination, with a camera, a lens, a shutter for the same, a motor, a shifting device for the shutter, a cam carried by the motor and adapted to operate the said shifting device, said cam being provided with an adjustable section arranged for engagement with the shutter-shifting device, whereby the time of exposure may be shortened or lengthened, a plate-receptacle operated from the motor, a plate-holder provided with gripping devices likewise operated from the motor, said gripping devices being arranged to receive a plate from the receptacle and carry it in the field of the lens, a bath-carriage having a platform to temporarily hold the plate, means for clamping the plate to the platform and releasing said plate therefrom, and a tension device controlling the movement of the carriage in one direction, the movement of the carriage in the opposite direction being controlled by said motor, as and for the purpose specified.

4. In a photographic apparatus, the combination, with the camera, a lens and a shutter for the same, a plate-receptacle located above the camera, gripping devices for the plates located beneath said receptacle, and a throat interposed between the receptacle and the plate-holder, arranged to guide the plates from one of said parts to the other, of a bath-carriage held to travel beneath the camera, a motor controlling the movement of the carriage in one direction, a tension device controlling the movement of the carriage in the opposite direction, the carriage being provided with a pocket to receive the washed and developed plate, a drop-bottom for said pocket, a feed connection between the motor and the plate-receptacle, and a reciprocating connection between the motor and the plate-holder, substantially as described.

5. In a photographic apparatus, the combination, with a camera, a lens, and a shutter for the same, a plate-receptacle located above the camera, a bottom for said plate-receptacle, means for holding the bottom stationary while the receptacle moves, and a plate-holder located beneath said receptacle, provided with gripping devices, said plate-holder being adapted to receive plates from said receptacle and carry said plates in the field of the lens, of a bath-carriage held to travel below the camera, provided with developing and washing compartments, and a pocket to receive the finished plate, said pocket being provided with a drop-bottom, a motor controlling the forward movement of the carriage, a tension device controlling the return movement of the carriage, a chute, a trip device near the chute, adapted to engage with and open the drop-door of the carriage on the return of said carriage, and a feed connection between the motor and the plate-receptacle and a reciprocating connection between said motor and said plate-holder, for the purpose set forth.

6. A photographic apparatus consisting of a camera, a support therefor, a lens, a shutter for the lens, a motor, a shifting device for the lens-shutter, a plate-receptacle located above the camera, a cam rotated by the motor, a shifting device connected with the plate-receptacle, a pin carried by the cam, operating the said shifting device, and a second shifting device connected with the said shutter, provided with a lever having an extension adapted to enter a depression in the cam, as and for the purpose specified.

7. In a photographic apparatus, the combination, with a camera, a lens and a shutter for the same, of a plate-receptacle located above the camera, a plate-holder located below the camera and provided with gripping devices, the said plate-holder being adapted to receive plates from the plate-receptacle, a motor, and cams carried by the said motor, connected with the plate-receptacle in a manner to horizontally move the same, being also connected with the lens-shutter in a manner to open and close the same, other of the cams being connected with the gripping devices of the plate-holder to open and close the same, substantially as shown and described.

8. In a photographic apparatus, the combination, with a camera, a lens and a shutter for the same, of a plate-receptacle located above the camera, a plate-holder located below the camera and provided with gripping devices, the said plate-holder being adapted to receive plates from the plate-receptacle, a motor, and cams carried by the said motor, connected with the plate-receptacle in a manner to horizontally move the same, being also connected with the lens-shutter in a manner to open and close the same, certain of the cams being connected with the gripping devices of the plate-holder to open and close the same, and a bath-carriage mounted to travel beneath the plate-holder, the said carriage having timed movement from the said motor, as and for the purpose set forth.

9. In a photographic apparatus, the combination, with a camera, a lens and a shutter for the same, of a plate-receptacle located above the camera, gripping devices arranged to receive the plates from the plate-receptacle, a bath-carriage held to travel beneath the lens and the plate-holder, the gripping devices being so located as to carry the plate in the field of the lens, and means, substantially as described, for operating the shutter, delivering the plates to the gripping devices, moving the carriage and moving the plates in the path of the said carriage, a pocket located at one end of the bath-carriage, adapted to receive the washed plate, a chute arranged to receive the plate from the pocket of the bath-carriage, and a shifting bottom for the aforesaid pocket, as and for the purpose specified.

10. In a photographic device, a camera, a plate-holder mounted to slide in front of the camera, a motor, a cam carried by the motor, a lever connected with the plate-holder, and held in engagement with said cam, an arm connected with the lever, and a reciprocating device actuated by the motor and engaged by said arm when the lever is upon the depressed portion of the said cam, as and for the purpose set forth.

11. In a photographic device, the combination, with a camera, a plate-holder mounted to slide in the path of the lens of the camera, a motor, cams carried by the motor, one of the said cams being provided with a salient surface and a depressed body-surface, the other cam having a salient surface and a series of depressed surfaces of varying depths, and an agitating device operated by the motor, of a lever connected with the plate-holder, engaging with the cam having the single body depression, and an arm carried by the lever, arranged to engage with the agitating device, a bath-carriage, and a lever connected therewith, engaging with the cam having the multiple depressed surfaces, substantially as shown and described.

12. In a photographic device, the combination, with a camera, a plate-holder mounted to slide in the path of the lens of the camera, a motor, cams carried by the motor, one of the said cams being provided with a salient surface and a depressed body-surface, the other cam having a salient surface and a series of depressed surfaces of varying depths, and an agitating device operated by the said motor, of a lever connected with the plate-holder, engaging with the cam having the single body depression, an arm carried by the lever, arranged to engage with the agitating device, a bath-carriage, a lever connected therewith and engaging with the cam having the multiple depressed surfaces, and adjusting-plates mounted upon the multiple-faced cam, having shoulders adjustable to and from the shoulders separating the various depressed surfaces of the said cam, substantially as described.

13. In a photographic device, the combination, with a camera, a plate-holder mounted to slide in the path of the lens of the camera, a motor, cams carried by the said motor, one of said cams being provided with a salient surface and a depressed body-surface, the other cam having a salient surface and a series of depressed surfaces of varying depths, and an agitating device operated by the said motor, of a lever connected with the plate-holder, engaging with the cam having the single body depression, an arm carried by the lever, arranged to engage with the agitating device, a bath-carriage, a lever connected therewith and engaging with the cam having the multiple depressed surfaces, adjusting-plates mounted upon the multiple-faced cam, having shoulders adjustable to and from the shoulders separating the various depressed surfaces of the said cam, a valve connected with a source of fluid-supply and also connected with a compartment in the bath-carriage, and a trip for the valve, actuated by the lever controlled by the multiple-faced cam, substantially as described.

14. The combination, with a movable plate-holder, a camera and a source of fluid-supply, of a movable bath-carriage provided with various chambers, a fluid-conductor connected with one of the said chambers and the source of fluid-supply, a propelling-lever connected with the carriage, a trip for the fluid-supply and operated by the said lever, and a motor in operative connection with the said lever, substantially as set forth.

15. The combination, with a movable plate-holder, a camera and a source of fluid-supply, of a movable bath-carriage provided with various chambers, a fluid-conductor connected with one of said chambers and the source of fluid-supply, a propelling-lever connected with the carriage, operating it in one direction, a trip for the fluid-supply and operated by the lever, a motor in operative connection with the said lever, and means for returning the bath-carriage to its normal position independent of the motor, substantially as set forth.

16. The combination, with a movable plate-holder, a camera, a source of fluid-supply, a motor, and a reciprocating and timed lifting connection between the motor and plate-holder, of a movable bath-carriage provided with various chambers, a fluid-conductor connected with one of the said chambers and the source of fluid-supply, a propelling device for the carriage and operated from the motor, a return device for the carriage operating independently of the motor, and means for supplying fluid to the said conductor through the medium of the propelling device, as and for the purpose specified.

17. The combination, with a movable plate-holder, a camera, a source of fluid-supply, a motor, and a reciprocating and lifting connection between the motor and plate-holder, of a movable bath-carriage, a shutter for the camera, operated by the said motor in advance of the bath-carriage, and means for delivering a plate from the bath-carriage, the said bath-carriage being provided with various chambers, a fluid-conductor connected with one of said chambers and the source of fluid-supply, a propelling device for the carriage, operated from the motor, a return device for the carriage and operating independently of the motor, and a device for supplying fluid to the said conductor through the medium of the propelling mechanism for the carriage, as and for the purpose specified.

18. The combination, with a motor and a lever having timed movement from the motor, of a bath-carriage receiving movement from said lever, the said carriage being provided with a receptacle for a developing, fixing and washing bath, a pocket for the washed plate, and a shifting bottom for the said pocket, substantially as described.

19. The combination, with a motor and a lever having timed movement from the motor, of a bath-carriage receiving advance movement from said lever, the said carriage being provided with receptacles having a developing, a fixing and a washing bath, a pocket for the washed plate, a shifting bottom for the pocket, a track upon which the said carriage travels, means substantially as described, to return the carriage, and a trip for the bottom of the pocket, as and for the purpose specified.

20. The combination, with a motor and a lever having timed movement from the motor, of a bath-carriage receiving advance movement from said lever, the said carriage being provided with receptacles having a developing, a fixing and a washing bath, a pocket for the washed plate, a shifting bottom for the pocket, a track upon which the said carriage travels, means substantially as described, to return the carriage, a trip for the bottom of the pocket, a plate-receiving chute located beneath the trip, a valve connected with a source of fluid-supply and with the washing-compartment of the carriage, and a trip-lever for the valve, operated by the mechanism for advancing the carriage, as and for the purpose set forth.

21. The combination, with a plate-receptacle, and a reciprocating plate-holder arranged to receive plates from the said receptacle, of a camera, a bath-carriage capable of movement beneath the plate-holder, a plate-receiver located upon the said carriage, clamping devices operating in conjunction with the receiver, and means, substantially as described, for moving the plate-holder and bath-carriage, and for moving the clamping devices in advance of the movement of the carriage, as and for the purpose set forth.

22. In a photographic device, a plate-receptacle, a throat in which the plates are received from the receptacle, a movable plate-holder located beneath the throat, and clamping or gripping levers carried by the holder and arranged to be opened by contact with an object which is in the path of the holder, as and for the purpose set forth.

23. In a photographic device, the combination, with a plate-receptacle, a support therefor provided with a throat, a bottom for the receptacle held stationary upon the support, a motor, and a connection between the motor and plate-receptacle for moving the latter, of a plate-holder, tension-controlled gripping-levers carried by the holder, being normally in gripping position and carried from said position by contact with the said throat, and a vibratory connection between the motor and the plate-holder, substantially as shown as described.

24. In a photographic device, the combination, with a plate-receptacle, a support therefor provided with a throat, a bottom for the receptacle held stationary upon the support, a motor, and a connection between the motor and plate-receptacle for moving the latter, of a plate-holder, tension-controlled gripping-levers carried by the holder, being normally in gripping position and carried from said position by contact with said throat, a vibratory and lifting connection between the motor and plate-holder, and a bath-carriage held to travel beneath the holder, time operated from the said motor, as and for the purpose set forth.

25. A bath-carriage provided with a developing-compartment, a fixing-compartment, a washing-compartment having an overflow, and a plate-receiving pocket located back of the washing-compartment, the said pocket being provided with a movable bottom, substantially as described.

26. In a photographic apparatus, a sliding plate-holder, a motor, cams carried by the motor, a bath-carriage, a lever connected with the plate-holder and engaging with one of the said cams, a second lever connected with the carriage, being in engagement with the other cam, adjustable shoulders located upon the carriage-cam, and arms adjustable with said shoulders, arranged for engagement with the lever of the plate-holder, substantially as set forth.

27. In a photographic apparatus, the combination, with a camera, its lens and the shutter for the lens, of a receptacle having a compartment for plates, means for releasing the plates, a feed device for the said plate-receptacle, a holder and a gripping device connected therewith, the holder being located below the plate-receptacle, receiving the plates therefrom, the said gripping device being arranged to hold a plate in the field of the lens, and a motor connected with and arranged to operate the lens-shutter and impart movement to the plate-receptacle and the plate-holder, as and for the purpose set forth.

28. In a photographic apparatus, the combination, with a camera, its lens and a shutter for the lens, of a receptacle having compartments for plates, a cover for the receptacle, and a retention device for the cover of the same, a gripping device located below the plate-receptacle, receiving the plates therefrom, the said gripping device being arranged to hold a plate in the field of the lens, and a motor connected with and arranged to operate the lens-shutter and impart movement to the plate-receptacle, a bath-carriage mounted to slide beneath the camera, the said carriage being provided with chambers, one adapted to receive a developing compound, another a fixing compound and another a washing compound, the said bath-carriage being operated from the said motor, and means for delivering the exposed plate from the bath-carriage to the exterior of the apparatus, as and for the purpose set forth.

MARGARITA MANN,
*Administratrix of the estate of Charles Mann, deceased.*

Witnesses:
    W. H. GREEN,
    E. S. ALLING.